United States Patent
Yoshida

(10) Patent No.: US 6,563,606 B1
(45) Date of Patent: May 13, 2003

(54) COMMUNICATION APPARATUS

(75) Inventor: Takehiro Yoshida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/169,973

(22) Filed: Oct. 13, 1998

(30) Foreign Application Priority Data

Oct. 14, 1997 (JP) .............................................. 9-296274

(51) Int. Cl.$^7$ ................................................. H04N 1/00
(52) U.S. Cl. ....................... 358/439; 358/434; 358/435; 358/438; 358/444
(58) Field of Search ................................ 358/439, 438, 358/441, 444, 1.2, 1.15, 1.18, 401, 434, 449, 435, 436, 405, 407

(56) References Cited

U.S. PATENT DOCUMENTS

| | | | | | |
|---|---|---|---|---|---|
| 4,561,767 A | * | 12/1985 | Aoki et al. | ..................... | 355/26 |
| 4,579,446 A | * | 4/1986 | Fujino et al. | .................. | 355/24 |
| 4,677,660 A | * | 6/1987 | Yoshida | ....................... | 379/100 |
| 4,903,146 A | * | 2/1990 | Nakahara | ..................... | 358/468 |
| 5,257,114 A | * | 10/1993 | Yoshida et al. | ............. | 358/448 |
| 5,289,290 A | * | 2/1994 | Suzuki et al. | ................ | 358/440 |
| 5,408,340 A | * | 4/1995 | Edamura | ..................... | 358/468 |
| 5,421,485 A | * | 6/1995 | Kashiwagi | .................. | 358/441 |
| 5,585,939 A | * | 12/1996 | Yoshida | ....................... | 358/438 |
| 5,619,344 A | * | 4/1997 | Yoshida et al. | ............. | 358/468 |
| 5,640,250 A | * | 6/1997 | Yoshida | ....................... | 358/468 |
| 5,682,248 A | * | 10/1997 | Yoshida | ....................... | 358/404 |
| 5,717,744 A | * | 2/1998 | Yoshida et al. | ............. | 379/100 |
| 5,784,179 A | * | 7/1998 | Yoshida | ....................... | 358/498 |
| 5,832,337 A | * | 11/1998 | Isemura | ....................... | 399/81 |
| 5,889,594 A | * | 3/1999 | Maekawa | ................... | 358/296 |
| 6,229,620 B1 | * | 5/2001 | Makitani et al. | ........... | 358/1.15 |

* cited by examiner

*Primary Examiner*—Edward Coles
*Assistant Examiner*—Tia A Carter
(74) *Attorney, Agent, or Firm*—Fitzpatrick, Cella, Harper & Scinto

(57) ABSTRACT

A communication apparatus appropriately controls the both-side recording and the both-side reading transmission with respect to a long size source document so as to supply an easily readable reception document to a user on a reception side. When the both-side reading is selected, while a receiver at a partner station is capable of performing the both-side recording and information of the source document is of regular size, this communication apparatus notifies the receiver on the partner station of information of page numbers of the source document and information on a front side or a back side of the source document to be transmitted for each page. If the receiver on the partner station is not capable of performing the both-side recording and/or the information of the source document is not of regular size, this communication apparatus notifies only the information on page numbers of the source documents to be transmitted.

2 Claims, 6 Drawing Sheets

COMMUNICATION APPARATUS

BACKGROUND OF THE INVENTION

1. Field of the Invention

The present invention relates to a communication apparatus such as a facsimile apparatus capable of performing both-side recording and both-side reading.

2. Related Background Art

Conventionally, a facsimile apparatus, which is capable of performing both-side recording, has been arranged to operate in such a manner that the first page of received information is recorded on a front side of the first page of recording sheets; the second page of the received information is recorded on a back side of the first page of the recording sheets; the third page of the received information is recorded on a front side of the second page of the recording sheets; the fourth page of the received information is recorded on a back side of the second page of the recording sheets, and so on, thus recording the received information on the front and back sides of the recording sheets one after another.

Also, it has been conventionally practiced that a facsimile apparatus, which is capable of performing both-side reading, is arranged to read information on front and back sides of a source document at a time when the both-side reading is selected for execution.

In some apparatuses, when at a transmission side front and back sides of plural source documents are read for transmission, only front sides of respective source documents are read altogether, and then, only back sides of them are read altogether. Since in such apparatuses, information on the source documents is transmitted in the same order as the information has been read, it is necessary to notify a receiving side of a front side or a back side of a page to be transmitted in order to enable the receiving side to record the information on the same order of original page numbers of the source documents.

Also, in an apparatus where information on front and back sides of each source document is read sequentially and then transmitted in the same order as it has been read, there may be a case where all-white page is not transmitted. In this case, it is necessary to notify a receiving side of a front side or a back side of a page to be transmitted in order to enable the receiving side to record the information in the same order of original pages of source documents as the both-side recording. Also, if the data read from both front and back sides of a source document and those read from a single-side of a source document are mixed, it is necessary to notify a receiving side of a front side or a back side of a page to be transmitted in order to enable the receiving side to record the information on the source documents in the same order as it has been read originally.

SUMMARY OF THE INVENTION

With a view to solving the problems discussed above, the present invention is designed. It is an object of the invention to provide improvements for a facsimile apparatus capable of performing both-side reading for transmission.

DETAILED DESCRIPTION OF THE PREFERRED EMBODIMENTS

Figure 1:
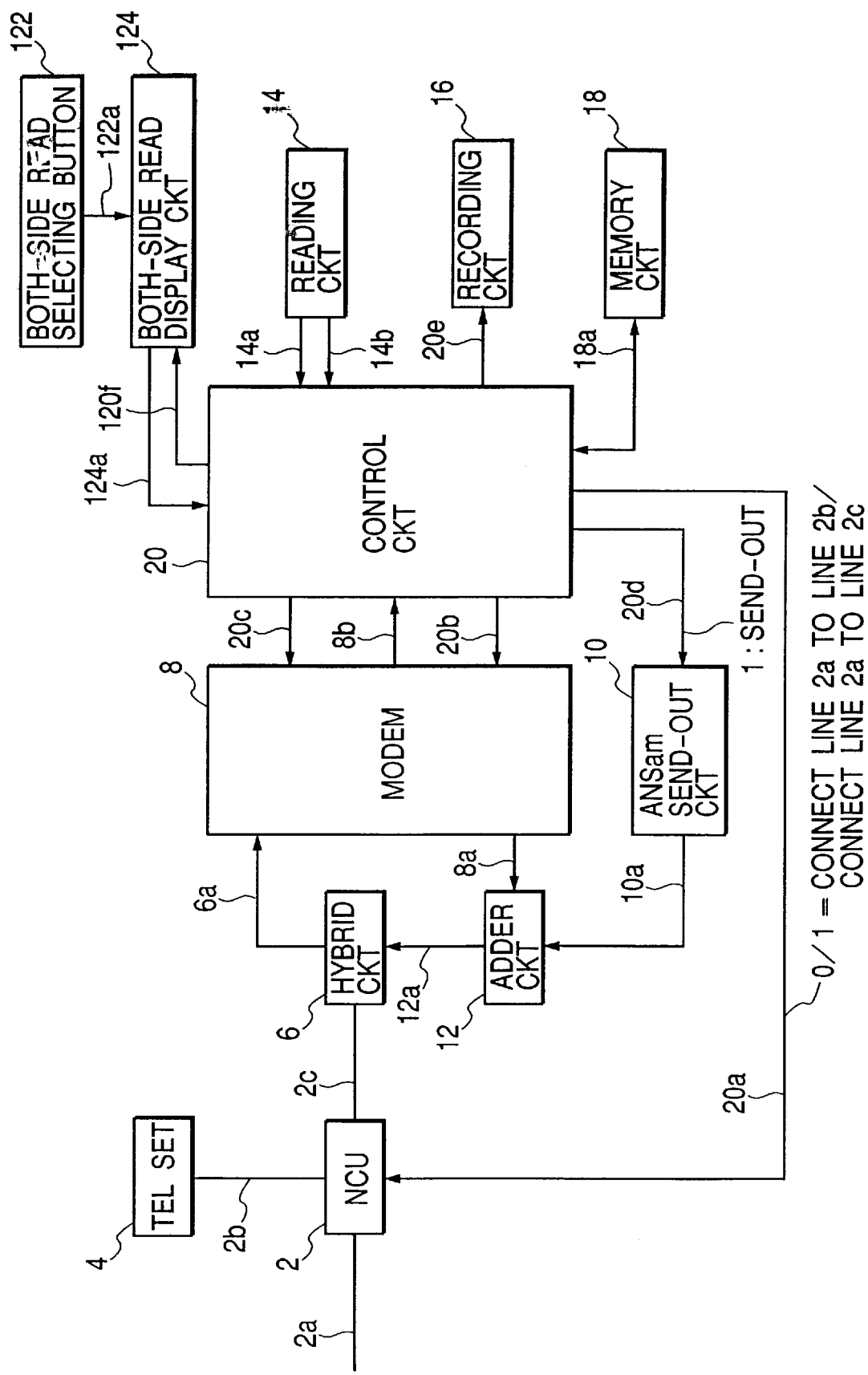
FIG. 1 is a block diagram which shows the structure of one embodiment in accordance with the present invention.
Figure 2:
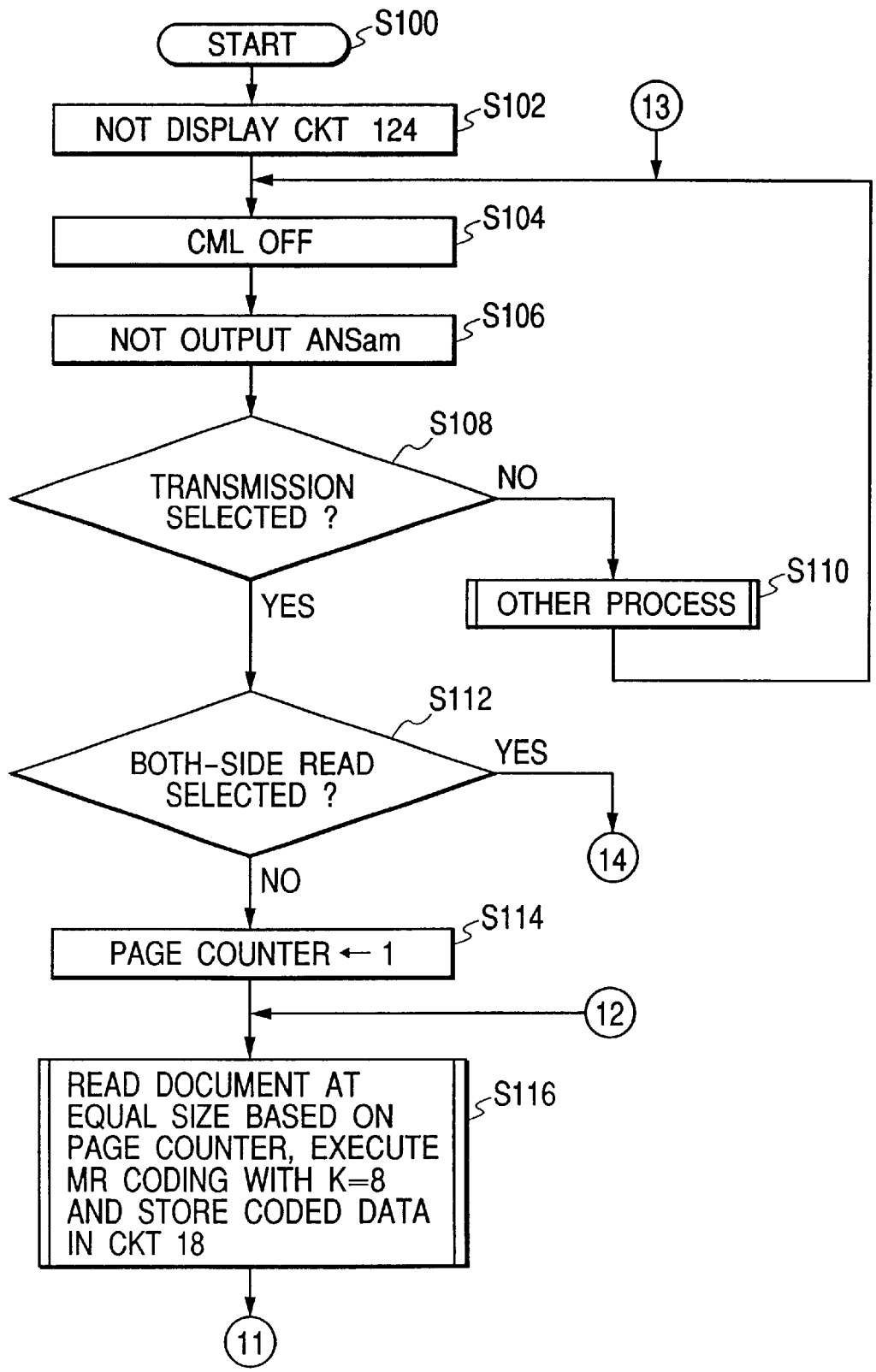
FIG. 2 is a flowchart which shows the operation of the embodiment represented in FIG. 1.
Figure 3:
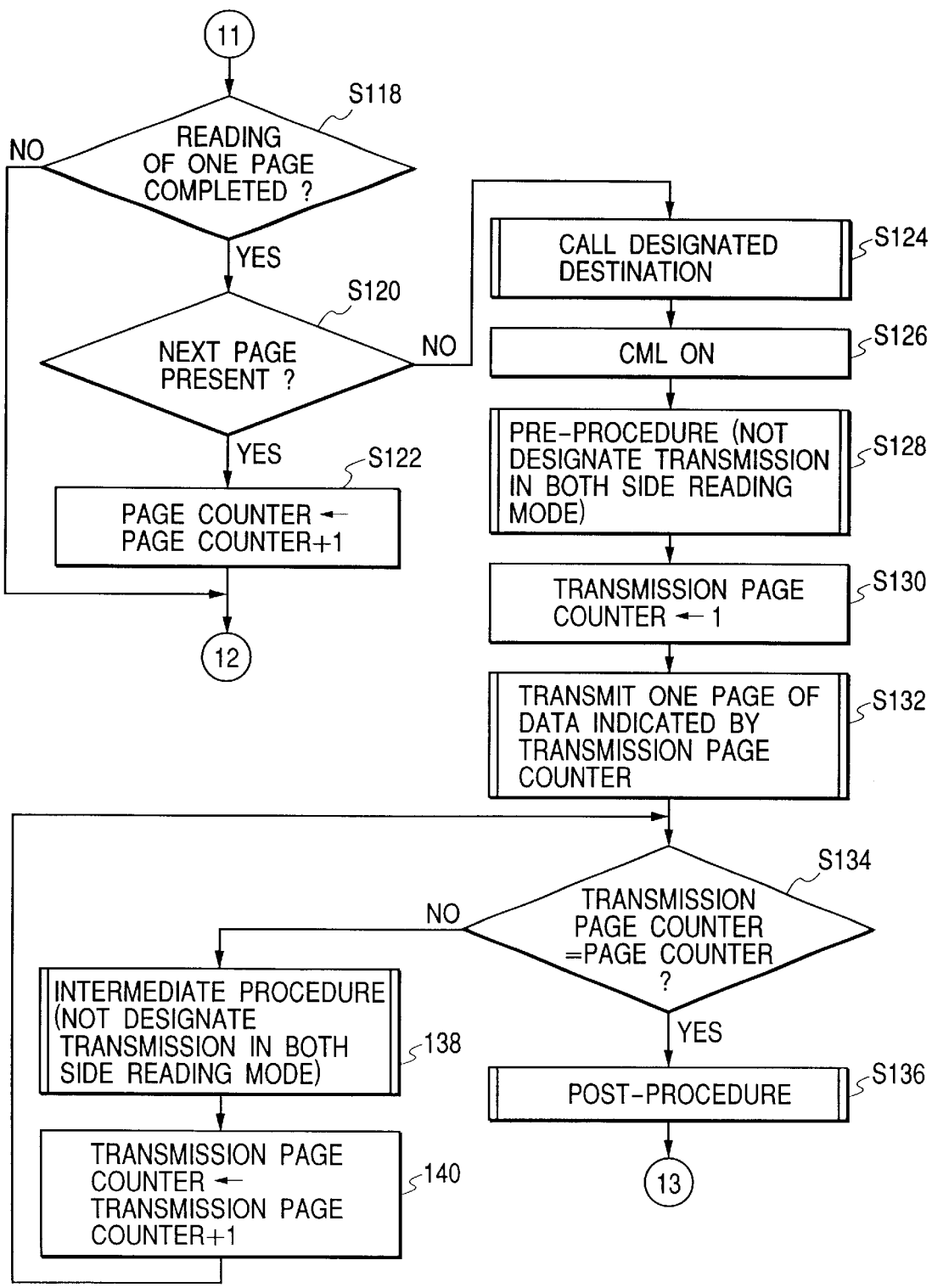
FIG. 3 is a flowchart which shows the operation of the embodiment represented in FIG. 1.
Figure 4:
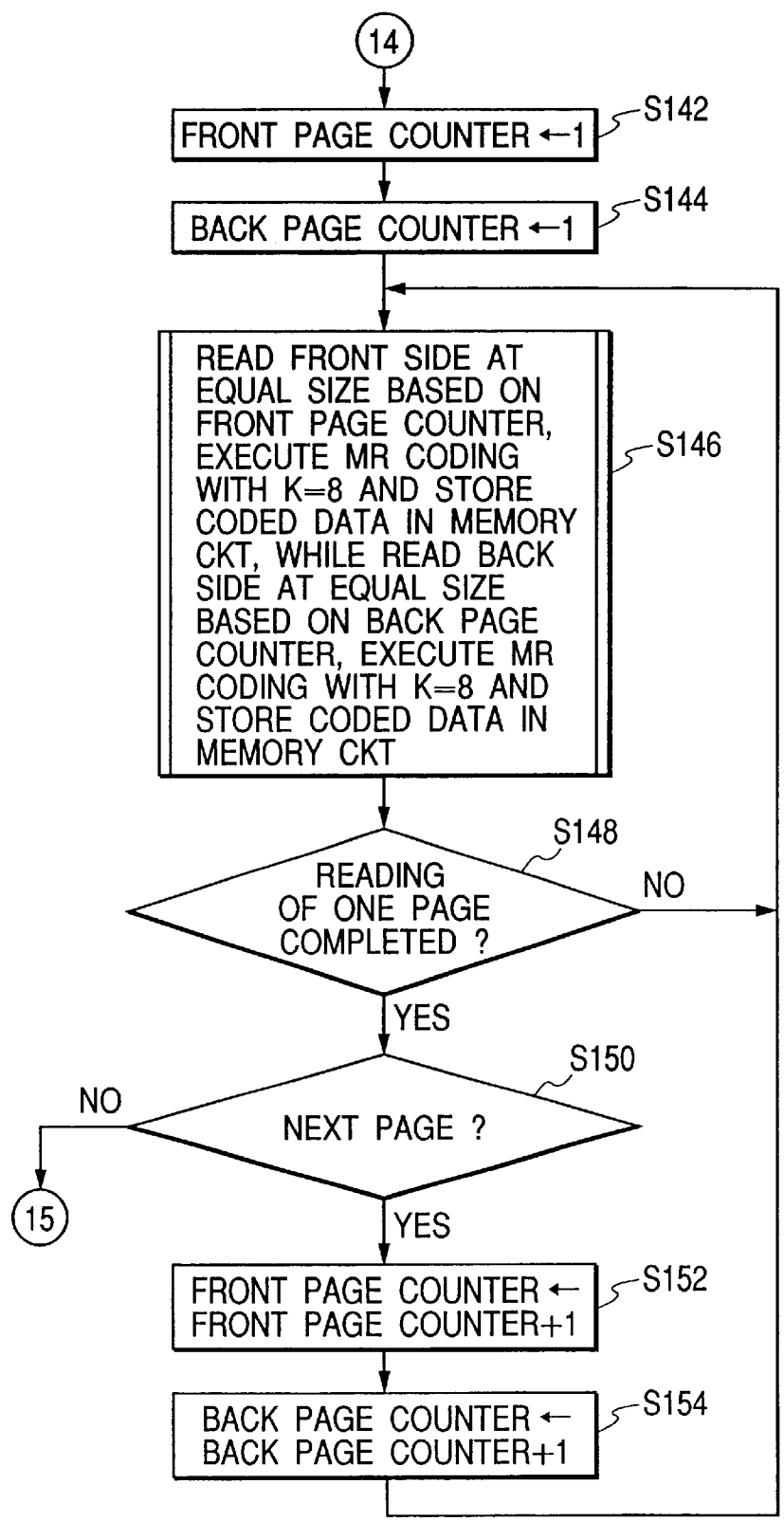
FIG. 4 is a flowchart which shows the operation of the embodiment represented in FIG. 1.
Figure 5:
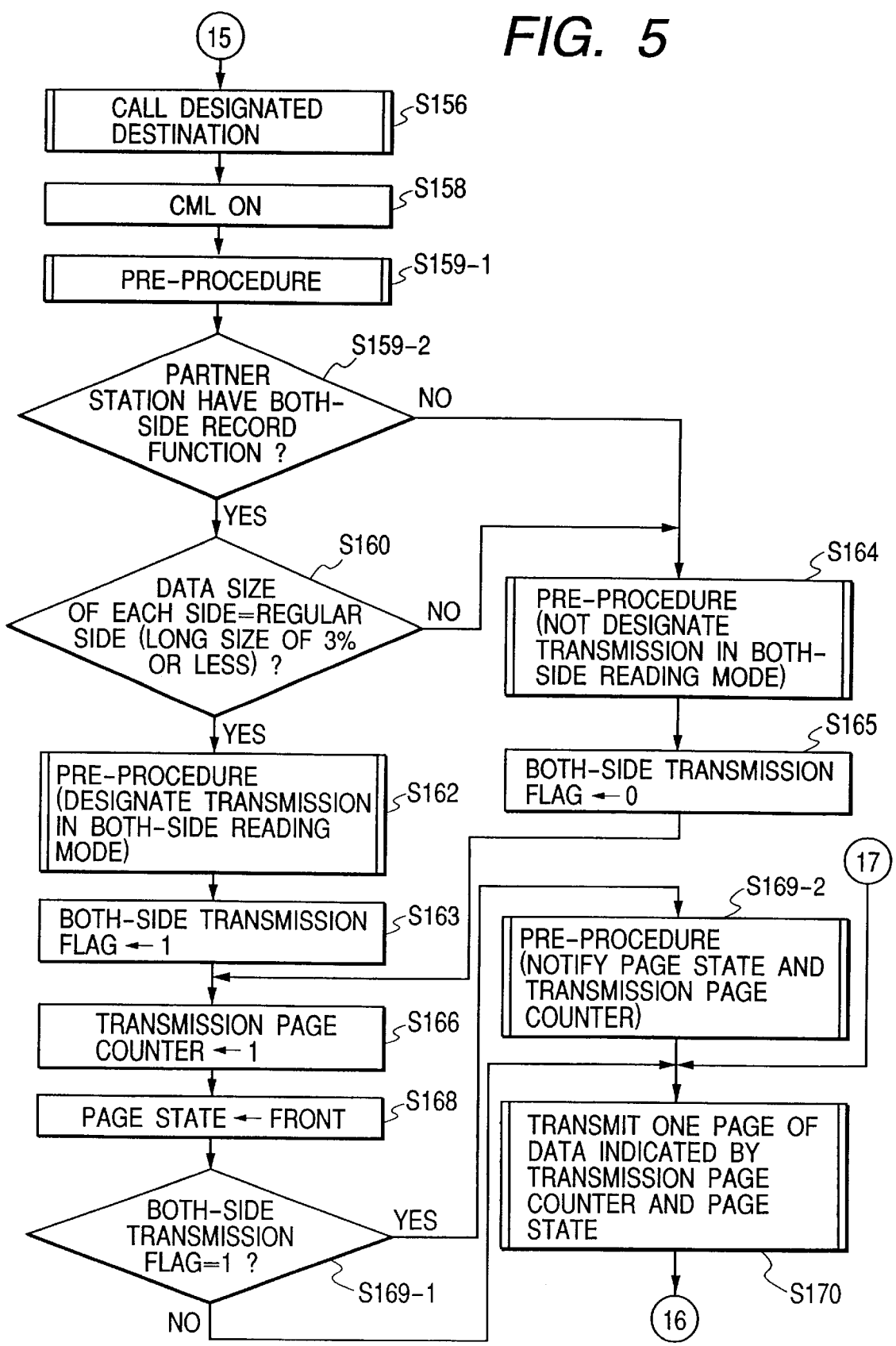
FIG. 5 is a flowchart which shows the operation of the embodiment represented in FIG. 1.
Figure 6:
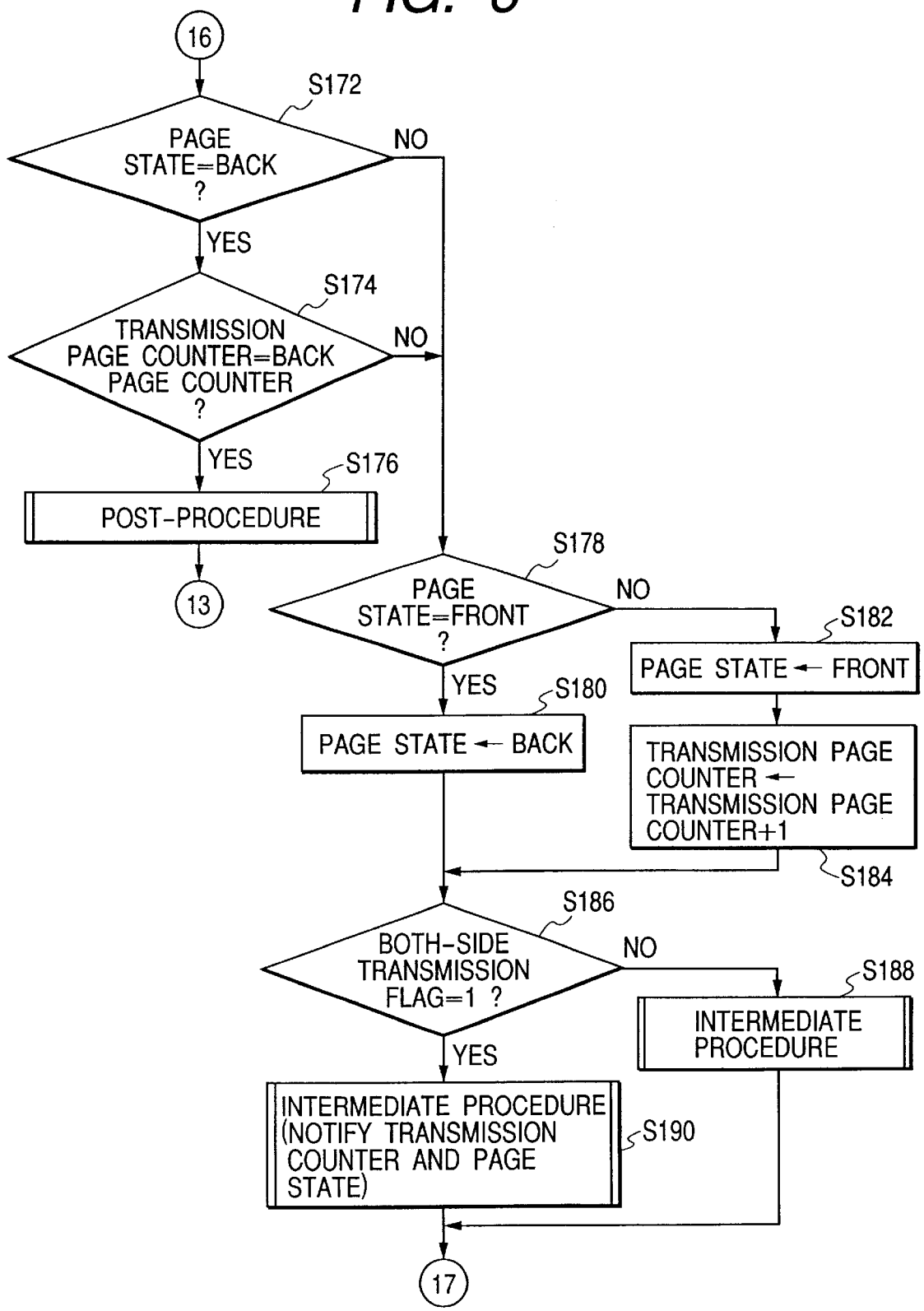
FIG. 6 is a flowchart which shows the operation of the embodiment represented in FIG. 1.

FIG. 1 is a block diagram which shows a structure of one embodiment in accordance with the present invention.

In FIG. 1, an NCU (net control unit) 2 is connected with a line terminal in order to use a telephone network for data communication or the like, and arranged to control the connection of a telephone exchanging network, to switch to a data communication line, and to hold a loop. Also, the NCU 2 connects a telephone line 2a to a telephone set 4 side if a level of a signal (on a signal line 20a) from a control circuit 20 is "0", and connects the telephone line 2a to a facsimile apparatus side if the signal level is "1". Here, in the normal status, the telephone line 2a is connected with the telephone set 4 side.

A hybrid circuit 6 separates signals of a transmission system and those of a reception system. The circuit transmits a transmission signal from an adder circuit 12 to the telephone line 2a through the NCU 2, and receives a signal from a communicating party through the NCU 2 to send to a MODEM 8 through a signal line 6a.

The MODEM 8 performs modulation and demodulation on the basis of ITU-T recommendations V. 8, V. 21, V. 27 ter, V. 29, V. 17, and V. 34, and designates a transmission mode by use of a signal line 20c. The MODEM 8 receives a signal output to a signal line 20b to provide modulated data to a signal line 8a, while receiving a reception signal output to the signal line 6a to provide demodulated data to a signal line 8b.

An ANSam send-out circuit 10 sends out an ANSam signal. When a signal having a signal level "1" is output to the signal line 20b, the ANSam signal is sent out to a signal line 10a, while no signal is output to the signal line 10a when a signal having a signal level "0" is output to the signal line 20d.

The adder circuit 12 receives the information of the signal line 8a and that of the signal line 10a, and outputs the result of the addition to a signal line 12a. A reading circuit 14 reads an image on a source document and outputs image data thus read to a signal line 14a.

A recording circuit 16 records the information output on a signal line 20e one line after another. Also, this recording circuit 16 is provided with a function to perform both-side recording on a regular size recording sheet (an A4-size sheet is exemplified in the description given below). When a signal having a signal level "0" is output to a signal line 20f, the recording is performed on a front side of the recording sheet, while it is performed on a back side of the recording sheet when a signal having a signal level "1" is output to the signal line 20f. Also, when a recording end pulse is provided on the signal line 20f, the recording of one page is completed.

A memory circuit 18 stores raw or coded information of read data. This circuit is also used for storing received information or decoded information.

The reading circuit 14 is capable of performing both-side reading, and outputs data read from a front side to the signal line 14a and data read from a back side to a signal line 14b.

A both-side read selecting button 122 is employed to select both-side reading by a user. When this button is depressed, a depression pulse is provided on a signal line 122a.

A both-side read display circuit 124 displays that the both-side reading has been selected. If a clear pulse is provided on a signal line 120f, the circuit is changed to a not-display state. Thereafter, the status is changed to "display", "not display", and "display" in turn each time the depression pulse is provided on the signal line 122a. Then, during the "display", a signal having a signal level "1" is output to a signal line 124a, while during the "not display", a signal having a signal level "0" is output to the signal line 124a.

Also, in the present embodiment, the control circuit 20 is arranged to notify a partner receiver of both information regarding page numbers of a source document and information on a front side or a back side of the source document, provided that when the both-side reading is selected at the time of transmission, the partner receiver is capable of performing both-side recording and information on the source document is of regular size. Also, this control circuit is arranged to notify the partner receiver of only the information on page numbers of the source document, if the partner receiver is unable to perform any both-side recording or the information on the source document is not of the regular size, whereby the control circuit controls the transmission as if a corresponding source document were a single-sided one.

Now, FIG. 2 to FIG. 6 are flowcharts which illustrate a control flow of the control circuit 20 in accordance with the present embodiment.

At first, a process starts in step S100. Then, in step S102, the clear pulse is provided on the signal line 120f to cause the both-side read display circuit 124 into the "not display" status. In step S104, the signal having the signal level "0" is output to the signal line 20a to turn off the CML. In step S106, the signal having the signal level "0" is output to the signal line 20d so that no ANSam signal is transmitted.

Then, in step S108, it is determined whether or not the transmission has been selected. If affirmative, the process proceeds to step S112. If negative, the process proceeds to step S110 to execute other process and then advances to the step S104.

In the step S112, the information on the signal line 124a is inputted, and it is determined whether or not the both-side reading has been selected. If affirmative, the process proceeds to step S142. If negative, the process proceeds to step S114 to set 1 at a page counter.

In step S116, a source document is read at equal size in accordance with the page counter, and the data thus read is encoded with MR-coding of K=8 and the coded data is stored on the memory circuit 18. In step S118, it is determined whether or not the reading of one page has been completed. If affirmative, the process proceeds to step S120. If negative, the process returns to the step S116.

In the step S120, it is examined if there is the next source document. If affirmative, the process proceeds to step S122 to increment the page counter by 1, and then proceeds to the step S116. Also, if there is not, the process proceeds to step S124 call a designated destination. Then, in step S126, the signal having the signal level "1" is output to the signal line 20a, turning on the CML.

In S128, a pre-procedure is executed. In this stage, the transmission of the both-side reading is not designated to a receiver of a partner station. Then, in, step S130, the page counter for transmission is set at "1", and in step S132 one page of information indicated by the transmission page counter is transmitted.

In step S134, it is determined whether or not the values of the transmission page counter and the page counter are the same. If affirmative, the process proceeds to step S136 where a post-procedure is executed. If negative, the process advances to step S138 where an intermediate procedure is executed. In the intermediate procedure, the transmission of the both-side reading is not designated to the partner receiver. Then, the process proceeds to step S140, incrementing the transmission page counter by 1, and the process advances to the step S132.

Also, in step S142, a front page counter is set at 1, while in step S144, a back side page counter is set at 1.

In step S146, the front page is read at equal size in accordance with the front page counter, the read data is encoded by the MR coding of K=8, and the coded data is stored in the memory circuit 18. Also, at the same time, the back side page is read in accordance with the back side page counter, the read data is coded by the MR coding of K=8, and the coded date is stored in, the memory circuit 18.

In step S148, it is determined whether or not reading of one page has been completed. If affirmative, the process proceeds to step S150. If negative, the process proceeds to the step S146.

In step S150, it is examined if there is the next source document. If affirmative, the process proceeds to step S152 to increment the front page counter by 1. Further, in step S154, the back side page counter is increased by 1. In the step S150, if there is not, the process proceeds to step S156.

Also, in the step S156, a call is issued to a designated destination. Thus, in step S158, the signal having the signal level "1" is output to the signal line 20a to turn on the CML.

Then, in step S159-1, the pre-procedure is executed. In step S159-2, it is determined whether or not the receiver at the partner station has function of performing the both-side recording. If affirmative, the process proceeds to step S160. If negative, the process proceeds to step S164.

In the step S160, it is determined whether or not all the pages of information on the front side and the back side are of regular size (long size within 3%). If affirmative, the process proceeds to step S162. If any one of them is not in regular size, the process proceeds to step S164.

In the step S162, the pre-procedure is executed. The transmission of the both-side reading is designated to the receiver on the partner station. Then, in step S163, 1 is set at the both-side transmission flag, and the process proceeds to step S166.

In the step S164, the pre-procedure is executed. The transmission of the both-side reading is not designated to the receiver at the partner station. Then, in step S165, 1 is set at the both-side transmission flag. The process proceeds to step S166.

In the step S166, 1 is set at the transmission page counter. In step S168, the front page is set as the current page status. Then, in step S169-1, it is determined whether or not the both-side transmission flag indicates 1. If the flag indicates 0, the process proceeds to step S170. If the flag indicates 1, the process proceeds to step S169-2.

In the step S169-2, the pre-procedure is executed. The page status and the transmission page counter (the front side of the page 1, for example) are notified to the receiver on the partner station. In step S170, information indicated by the page status and the transmission page counter is transmitted by one page.

Then, in step S172, it is determined whether or not the current page status is the back side. If affirmative, the process proceeds to step S174. If the status is the front side, the process proceeds to step S178.

In the step S174, it is examined if the values of the transmission page counter and the back side page counter are identical. If affirmative, the process proceeds to step S176 where the post-procedure is executed. If negative, the process proceeds to step S178.

In the step S178, it is determined whether or not the current page status is the front page. If affirmative, the process proceeds to step S180 where the front side is set as the current page status. Then, in step S184, the transmission page counter is incremented by 1. The process proceeds to step S186.

In the step S186, it is examined if the both-side flag indicates 1. If affirmative, the process proceeds to step S190, and if the flag indicates 0, the process advances to step S188.

In the step S188, the intermediate procedure is executed. Then, the process proceeds to step S170. Also, in step S190, the intermediate procedure is executed to notify the current page status and the transmission page counter (the back side of the P3, for example) to the receiver on the partner station. Thus, the process proceeds to the step S170.

In this respect, the operation of the control circuit as described above is executed the CPU of the control circuit in accordance with program stored on ROM or RAM installed on the control circuit. For the present invention, however, such program may be stored on a floppy disc, a hard disc, a magneto-optic disc, a CD-ROM, or some other external storage media, and the aforesaid operation may be executed by the CPU of the control circuit in accordance with the program read in the control circuit using a dedicated reading apparatus.

Also, in accordance with the above embodiment, a facsimile apparatus of stand alone type is exemplified for the description. However, the present invention is not necessarily limited to the facsimile apparatus of the kind. It is of course possible to apply the present invention to the data communication control of a composite data processing system in which a copying function, an electronic filing function, and also, a data processing function are combined with the communication function.

What is claimed is:

1. A communication apparatus, comprising:

reading means for selectively performing a single-side reading and a both-side reading of information of a source document;

determination means for determining whether or not the information of the source document to be read is of a regular size;

detection means for detecting whether or not a receiver at a partner station is capable of performing the both-side recording in accordance with a procedural signal;

selection means for selecting the both-side reading in accordance with an operation of an operator; and control means for notifying the receiver at the partner station of information of page numbers of the source document and information on a front side or a back side of the source document for each transmitting page if the receiver at the partner station is capable of performing both-side recording and the information of the source document is of regular size, while notifying only the information of page numbers of the source document to be transmitted if the receiver at the partner station is not capable of performing the both-side recording and/or the information of the source document is not of regular size in a case where both-side reading is selected by said selection means.

2. A communication apparatus according to claim 1, wherein when said both-side reading is selected and the receiver at the partner station is not capable of performing the both-side recording and/or the information of the source document is not of regular size, the information read from the both-side source document is transmitted as if read from a single-side source document.

* * * * *